Patented Nov. 1, 1932

1,885,884

UNITED STATES PATENT OFFICE

EARL B. ALVORD, OF CLEVELAND HEIGHTS, OHIO, ASSIGNOR, BY MESNE ASSIGNMENTS, TO THE GRASSELLI CHEMICAL COMPANY, OF CLEVELAND, OHIO, A CORPORATION OF DELAWARE

INSECTICIDE AND PROCESSES OF MAKING SAME

No Drawing.   Application filed August 10, 1928.   Serial No. 298,870.

Manganese arsenate insecticides have been disclosed in U. S. Reissue Patent 16,933, dated April 10, 1928. They are obtained by the action of a higher oxygen compound of manganese upon arsenious acid and consist of complex, intimate mixtures of various manganese arsenates.

U. S. Patents 1,648,596, 1,648,597 and 1,648,577, all dated November 8, 1927, disclose further that the action of alkaline agents, such as lime and magnesia, upon the above manganese arsenate insecticides produces complex manganese-alkaline earth metal arsenates which were also found of value as insecticides.

I have now found that similar complex manganese-lead arsenates display valuable insecticidal properties which distinguish them favorably from straight lead and straight manganese arsenates or their mechanical mixtures as well as from the above manganese-alkaline earth metal arsenates, and my invention comprises the novel manganese-lead arsenates themselves, and processes of producing same.

My novel processes comprise acting with certain lead compounds upon a manganese arsenate. The products resulting from this reaction are complex manganese-lead arsenates.

The reaction mechanism and the exact chemical composition of the resulting products are not perfectly understood. It is assumed that when an oxygen compound of lead or a lead salt of a weak acid are allowed to react upon an acid manganese arsenate, such as dimangano-arsenate, a manganese-lead arsenate is formed.

A double decomposition seems to take place in the case of tri-mangano-arsenate; it results in the formation of similar complex manganese-lead arsenates and more or less colored, difficultly soluble manganese compounds which remain intimately admixed with the arsenate.

The manganese-arsenate insecticides of Reissue Patent 16,933, cited above, contain probably the various types of arsenates, and it is assumed that when a lead compound is allowed to react upon such products both these reactions will occur.

While it is possible to obtain my novel complex manganese-lead arsenates by reacting with a lead compound upon a manganese arsenate of any desired composition, and irrespective of the process by which it is produced, I prefer to apply my novel process to manganese arsenates produced by the action of a higher oxide of manganese upon arsenious acid as disclosed in the above reissue patent.

The reaction with the lead compound may take place conjointly with the formation of the arsenates, or I might react with the lead compound upon the finished manganese arsenate either when still contained in the original reaction mixture or after it has been isolated. The resulting products are, in each instance, entirely comparable. The presence of the lead compound during the formation of the manganese arsenate slows down, however, this latter reaction, but does not otherwise materially affect the result.

It is further shown in an application for Letters Patent, Serial 240,927, filed in the U. S. Patent Office on December 17, 1927, by one, W. K. Schweitzer, that it is desirable, in order to obtain manganese-alkaline earth metal arsenate insecticides of low water soluble $As_2O_5$ content, to effect the reaction between the oxidizing manganese compound and the arsenious acid under superatmospheric pressure and at a temperature above 100° C.

This improvement over the original procedure is also applicable when it is desired to react with a lead compound upon the primary manganese arsenate.

The lead compounds useful in my novel process are particularly those able to react with arsenic acid to form lead arsenate. They can be exemplified by oxygen compounds of lead and lead salts of weak acids and amongst such products the following can be used quite successfully; lead dioxide, lead sesquioxide, litharge, white lead, lead carbonate, lead acetate, etc. Litharge is, for economical reasons, the most available compound of the type which will react readily with manganese arsenates.

The amount of lead compound used in my novel process can be varied within wide limits. Excellent insecticides have been produced by using an amount of a lead compound equivalent to from 2 to 20% of the manganese combined with the arsenic acid.

In the practical application of my invention, I prepare a thick slurry of manganese arsenate in water, heat this slurry and add the lead compound. The progress of the reaction is difficult to follow by chemical tests. My novel manganese-lead arsenates shows, however, a lower content of water soluble $As_2O_5$ and the decrease of this in the reaction mixture is the most convenient method of controlling the reaction. When the desired degree of water soluble $As_2O_5$ is obtained, I simply dry the reaction mass and grind the final product.

In an alternate process I mix the manganese ore, e. g., pyrolusite, white arsenic, and the lead compound; work this into a thick slurry with water and, with good agitation, heat the reaction mass until the arsenious acid is completely oxidized. A catalyst such as nitric acid can be added if desired. The oxidation of the arsenious acid will be considerably slower in the presence of than in the absence of the lead compound.

It was also found that substantially no reaction takes place when a manganese arsenate and litharge are mixed dry. When such a dry mixture is mixed with water for the purpose of applying as a liquid spray, the same reaction as above takes place. Similarly when such a mixture is dusted on plant growths, the formation of the complex lead manganese arsenate will go on in the presence of moisture.

In my preferred process I react with the lead compound upon the manganese arsenate in the presence of water at superatmospheric (say 60 lbs. per square inch) pressure, and correspondingly higher temperature. This completes the reaction in a shorter time and insures a very low water soluble $As_2O_5$ content.

The resulting products are greyish to brownish powders. They have a low water soluble $As_2O_5$ content. The exact chemical structure of these products is not known. It is assumed from their manner of preparation that they are complex arsenates in which the arsenic acid is partly neutralized by the manganese and partly by the lead radicle. No experimental evidence is available to substantiate this theory, and I wish it understood that my invention is not to be limited by the above theory or any similar explanation of the chemical reactions involved in the preparation of my novel products or by any other interpretation of the chemical composition of the products. The term "complex manganese-lead arsenates" is used herein for convenience' sake, and merely implies that the products contain the manganese and lead radicles in combination with the radicle of arsenic acid and that they are obtained by the action of a lead compound upon a manganese arsenate.

The relative proportions of lead and manganese in my novel products can be varied within wide limits. One beneficial effect of the action of the lead compounds upon the manganese arsenates is the reduction of the water soluble $As_2O_5$ content. This effect is already obtained with an amount of lead compound equivalent to about 1 or 2% of the manganese combined with the arsenic acid. Somewhat higher amounts of lead are, however, desirable in view of the improvement in the physical properties of the insecticides; while the toxicity does not seem to be greatly enhanced by the presence of the lead in my novel insecticides, these show, however, better sticking power and lower density, i. e., more volume per unit of weight which means a better distribution over the vegetation treated with the insecticide. Increasing the lead to over an amount equivalent to about 20% of the manganese radicle does not seem to improve the insecticidal properties of the products, but would simply dilute the active ingredient and deter from one of the features of the manganese arsenates which is the relatively high percentage of combined arsenic acid therein.

My invention is further illustrated by the following examples. My novel process is shown therein as applied to manganese arsenates obtained by the interaction of a higher oxide of manganese and arsenious acid and to the use of litharge, but it is understood that other manganese arsenates and other lead compounds capable of reaction with arsenic acid to form lead arsenate can be used and similar manganese-lead arsenate insecticides produced.

1. 4,000 parts water, 200 parts arsenic acid, 200 parts finely ground Javanese pyrolusite ore and 10 parts litharge were introduced into a horizontal, rotating, lead-lined autoclave containing Danish pebbles. This was gas heated to develop 70 to 80 lbs. pressure; the progress of the reaction was followed by determining the rate of oxidation of the arsenious acid which was complete after 11 hours heating. The reaction mass was run on steam-heated cast-iron hot plates and evaporated to dryness. The crude product was then finely ground. It represents a dark gray powder and showed 0.81% water soluble $As_2O_5$. The product is very effective in controlling various insect pests on fruit trees.

2. A manganese arsenate was first produced by reacting with 200 parts white arsenic upon 200 parts pyrolusite ore in 4000 parts water in a lead-lined autoclave heated to 70 to 80 lbs. pressure, internal steam. The completion of the reaction required about 5 hours. 10 parts litharge were then added and heating continued until the water soluble $As_2O_5$ content was reduced below 1%, which required about 6 more hours. The product was then isolated, dried and ground as in the preceding example. It was a dark grey powder containing 43.3% total $As_2O_5$ and 0.85% water soluble $As_2O_5$. It is entirely similar to the product of Example 1.

3. 200 lbs. white arsenic and 200 lbs. pyrolusite ore were allowed to react in 950 lbs. water in a porcelain-lined autoclave at 60 lbs. pressure. The charge was completely oxidized in 1½ hours. The charge was then blown into a steel autoclave. 80 lbs. litharge and 2 lbs. sulfite cellulose waste added. The latter is used to improve the spreading properties of the finished insecticide. This was then heated for one hour at 60 lbs. internal steam pressure; the autoclave was then emptied, the slurry dried over a drum drier and the product finely ground. It is a grey soft powder, containing a total of 44.5% $As_2O_5$ and 0.18% water soluble $As_2O_5$. It has a very low density, showing 70.0 cu. in. per lb. in the Coad density test.

I claim:

1. As a new product, an insecticide comprising a manganese arsenate obtained from the interaction of arsenious acid and pyrolusite and which has been modified by the action thereon in water suspension and at a temperature of not less than about 100° C. of an amount of litharge equivalent to not more than about 20% of the manganese combined with the arsenic acid.

2. The process of producing a complex manganese-lead arsenate which comprises reacting with litharge in aqueous suspension and at a temperature of not less than about 100° C. upon a manganese arsenate.

3. As a new product, an insecticide comprising a manganese arsenate associated with a lead compound, said lead compound being the product obtained by reacting in aqueous suspension with manganese arsenate upon one of the compounds of the group consisting of oxygen compounds of lead and lead salts of weak acids.

4. As new product, an insecticide comprising a manganese arsenate associated with a lead compound, said lead compound being the product obtained by reacting in aqueous suspension with manganese arsenate upon one of the compounds of the group consisting of lead dioxide, lead sesquioxide, litharge, white lead, lead carbonate and lead acetate.

5. As a new product, an insecticide having a water soluble $As_2O_5$ content below 1%, comprising a manganese arsenate associated with a lead compound, said lead compound being the product obtained by reacting with litharge in aqueous suspension and at a temperature of not less than about 100° C. upon a manganese arsenate.

6. In a process of producing a complex manganese-lead arsenate from manganese arsenate produced by the action of a pyrolusite ore upon arsenious acid in water suspension and under super-atmospheric pressure, the steps which comprise reacting upon manganese arsenate with litharge in an amount not exceeding about 20% of that equivalent to the manganese combined with the arsenic acid.

7. In a process of producing a complex manganese-lead arsenate from manganese arsenate produced by the action of a pyrolusite ore upon arsenious acid in water suspension and under super-atmospheric pressure and at a temperature above 100° C., the step consisting in adding litharge to the water slurry of said manganese arsenate in an amount equivalent to not more than 20% of the combined manganese and heating the so obtained slurry to about 70 to 80 lbs. internal steam pressure until the amount of water soluble $As_2O_5$ contained in the isolated dry reaction product is less than about 1%.

In testimony whereof, I affix my signature.

EARL B. ALVORD.